United States Patent Office 3,657,153
Patented Apr. 18, 1972

3,657,153
PROCESS FOR THE PREPARATION OF A CATALYST FOR THE REFORMING AND AROMATIZATION OF BENZINES
Victor Bucur, Trairan Mircea Filotti, Eugenia Georgescu, Theodora Mazare, Ion Ghejan, Ion Zirna, Elena Lygia Popescu, and Toma Ioszt, Ploiesti, Rumania, assignors to Institutul de Cercetari Pentru Prelucrarea Titeiului, Ploiesti, Rumania
No Drawing. Filed Apr. 1, 1970, Ser. No. 24,847
Claims priority, application Rumania, Apr. 8, 1969, 59,666/69
Int. Cl. B01j 11/40
U.S. Cl. 252—455 R                    2 Claims

ABSTRACT OF THE DISCLOSURE

A method of producing a catalyst for the reforming and aromatization of hydrocarbons which comprises reacting alumina containing between 4% and 40% water by hydration with a silicon halide, preferably silicon tetrachloride so that 0.05% to 5% silica is contained in the finished catalyst. Platinum is then deposited upon the silica-containing support.

---

The present invention relates to a process for preparing a catalyst for the reforming and aromatization of benzines, the catalyst being of the platinum on an alumina support type.

Processes are known for the preparation of reforming catalysts by introducing into their composition certain promoters, such as silica, which form with an alumina support acidic centers or sites similar to those of the cracking catalysts.

The catalysts obtained according to these processes, and which contain about 70% of silica, have the disadvantage of low selectivity because they favor the hydrocracking reactions.

Processes are also known for preparing catalysts with a low content of silica in the alumina support, with the view of increasing the thermal stability of the catalyst and of diminishing the coke and hydrocarbon production in the reforming process.

These processes have the disadvantage of achieving an unsatisfactory dispersion of the promoters on the support surface, and the selectivity of the catalyst in the reforming reactions is low.

The process according to the invention avoids the above-mentioned disadvantages in that, in order to obtain an surface, and the selectivity of the catalyst in the reforming and aromatization of benzines, silica is deposited on the surface of an alumina containing 4% to 40% of water, before or after thermal activation, by contacting the said alumina with a silicon tetrachloride solution in an organic solvent (a hydrocarbon or a mixture of hydrocarbons with boiling points between 60° and 90° C.), the ratio of the halogenated compound being so calculated that finally, after deposition of the platinum, the catalyst shall contain between 0.05% and 5% of silica.

The application of the process for the preparation of a catalyst for the reforming and aromatization of benzines according to the invention is illustrated in the following example:

A 1000 gram sample of a mixture of aluminum hydrates, predominantly bayerite, containing 29.5% of water, as determined by heating a specimen for one hour at 900° C. and determining weight loss, was milled to obtain a powder, and subsequently treated with 1200 ml. of a silicon tetrachloride solution in a gasoline fraction with a distillation range 60° to 90° C. The concentration of the silicon tetrachloride was of 0.17 g. per 100 ml. of gasoline. The solution was gradually added to the continuously stirred alumina powder. At the end, a paste was obtained from which the solvent was removed by heating for 4 hours at 100° C. The material was then treated with 500 ml. of aqueous nitric acid solution, containing 3 grams of nitric acid per 100 ml. After homogenization, the paste was extruded using an extrusion die of 1.5 mm. diameter. The material was dried for 4 hours at 110° C., then calcined for 8 hours at 550° C. The calcined extruded rods were cut to approximately 10 mm. length and contacted with an aqueous solution containing hexachloroplatinic acid, hydrochloric acid and nitric acid. The concentrations of these acids were so chosen that the finished catalyst contained 0.36% platinum. After 3 hours of contact at room temperature, the solid material was separated from the solution by centrifuging, dried for 2 hours at 110° C. and calcined for 4 hours at 550° C.

The so-prepared catalyst was tested under industrial conditions by processing 12 m.$^3$ of benzine/kg. of catalyst. Both the fresh catalyst and that tested under industrial conditions, and then regenerated, were analyzed from the chemical, physical-structural and activity point of view.

For the determination of the catalyst activity, the two catalyst samples were tested in a pilot plant, working with fixed bed, the reaction zone having a capacity of 100 cm.$^3$. The applied working conditions were: pressure 40 atm. volumetric rate of flow 2 h.$^{-1}$; recirculation ratio of gases 12 moles $H_2$/mole of hydrocarbon, and at the two reaction temperatures: 490° C., and 500° C. The used feed stock was a hydrofined heavy petrol, with distillation range 130° to 190° C. and having the following composition: paraffins 49.2% by vol., naphthenes 36.9% by vol., aromatics 13.9% by vol.

The chemical and physical-structural characteristics of the two catalyst samples are shown in Table 1 and the activity characteristics in Table 2.

TABLE 1.—CHEMICAL AND PHYSICAL-STRUCTURAL CHARACTERISTICS

|  | Fresh catalyst | Catalyst [1] |
|---|---|---|
| Chemical composition, percent by weight: | | |
| Platinum content | 0.37 | 0.37 |
| Chlorine content | 0.78 | 0.26 |
| Silica content | 0.1 | 0.1 |
| $Na_2O$ content | 0.010 | 0.018 |
| $Fe_2O_3$ content | 0.015 | 0.13 |
| Physical-structural characteristics: | | |
| Specific surface, m.$^2$/g | 186 | 171 |
| Pore volume, cm.$^3$/g | 0.63 | 0.57 |
| Apparent density | 1.14 | 1.26 |

[1] After long duration test under industral conditions, and regeneration.

TABLE 2.—ACTIVITY CHARACTERISTICS

|  | Fresh catalyst | Catalyst [1] |
|---|---|---|
| Performances obtained at the temperature of 490° C.: | | |
| Yield in depentanized, reformed product, percent by weight | 87.2 | 87.5 |
| Aromatics content of depentanized, reformed product, percent by volume | 61.0 | 58.5 |
| Research octane number of depentanized, reformed product | 91.0 | 89.2 |
| Performances obtained at the temperature of 500° C.: | | |
| Yield in depentanized, reformed product, percent by weight | 84.0 | 84.1 |
| Aromatics content of depentainized, reformed product, percent by volume | 69.3 | 66.0 |
| Research octane number of depentanized, reformed product | 96.8 | 95.0 |

[1] After long duration test under industrial conditions, and regeneration.

To point out the particular stability of the activity of the catalyst prepared according to the invention and shown above, two other catalyst samples were prepared for comparison, having as acidulating promoters fluorine and/or chlorine, and not containing silica.

Thus, a 1000 gram sample of the same mixture of aluminum hydrates, in the form of a powder, was processed in the same way as in the example according to the invention, but without the steps of treating with silicon tetrachloride solution in gasoline and drying for the removal of the solvent. The so prepared catalyst was tested under industrial conditions by processing 12 m.$^3$ of feed stock/kg. of catalyst and analyzed under the same conditions as in the example according to the invention.

The characteristics of this catalyst are shown in Tables 3 and 4.

TABLE 3.—CHEMICAL AND PHYSICAL-STRUCTURAL CHARACTERISTICS

|  | Fresh catalyst | Catalyst [1] |
|---|---|---|
| Chemical composition, percent by weight: |  |  |
| Platinum content | 0.36 | 0.36 |
| Chlorine content | 0.70 | 0.24 |
| Na$_2$O content | 0.007 | 0.02 |
| Fe$_2$O$_3$ content | 0.019 | 0.07 |
| Physical-structural characteristics: |  |  |
| Specific surface, m.$^2$/g | 212 | 162 |
| Pore volume, cm.$^3$/g | 0.6 | 0.59 |
| Apparent density | 1.22 | 1.37 |

[1] See footnote bottom of Table 1.

TABLE 4.—ACTIVITY CHARACTERISTICS

|  | Fresh catalyst | Catalyst [1] |
|---|---|---|
| Performances obtained at the temperature of 490° C.: |  |  |
| Yield in depentanized, reformed product, percent by weight | 86.7 | 90.0 |
| Aromatics content in the depentanized, reformed product, percent by volume | 60.6 | 50.0 |
| Research octane number of the depentanized, reformed product | 90.7 | 79.7 |
| Performances obtained at the temperature of 500° C.: |  |  |
| Yield in depentanized, reformed product, percent by weight | 83.7 | 85.5 |
| Aromatics content in the depentanized, reformed product, percent by volume | 67.6 | 54.5 |
| Research octane number of the depentanized, reformed product | 94.6 | 82.0 |

[1] See footnote bottom of Table 1.

Another 1000 gram sample of the same mixture of aluminum hydrates, in the form of powder, was treated with 500 ml. of an aqueous solution containing 3 g. of nitric acid and 0.77 g. of hydrofluoric acid per 100 ml., without applying the treatment with silicon tetrachloride solution. After homogenization, the paste was extruded, dried, calcined, and the material was contacted with the platinum-containing solution, then again dried and calcined, applying the same procedure as in the example according to the invention. The obtained catalyst was also tested under the same industrial conditions by processing 12 m.$^3$ of feed stock/kg. of catalyst.

The chemical and physical-structural characteristics are shown in Table 5, and the activity characteristics in Table 6.

TABLE 5.—CHEMICAL AND PHYSICAL-STRUCTURAL CHARACTERISTICS

|  | Fresh catalyst | Catalyst [1] |
|---|---|---|
| Chemical composition, percent by weight: |  |  |
| Platinum content | 0.40 | 0.40 |
| Chlorine content | 1.06 | 0.11 |
| Fluorine content | 0.41 | 0.19 |
| Na$_2$O content | 0.008 | 0.013 |
| Fe$_2$O$_3$ content | 0.01 | 0.03 |
| Physical-structural characteristics: |  |  |
| Specific surface, m.$^2$/g | 216 | 171 |
| Pore volume, cm.$^3$/g | 0.64 | 0.60 |
| Apparent density | 1.14 | 1.18 |

[1] See footnote bottom of Table 1.

TABLE 6.—ACTIVITY CHARACTERISTICS

|  | Fresh catalyst | Catalyst [1] |
|---|---|---|
| Performances obtained at the temperature of 490° C.: |  |  |
| Yield in depentanized, reformed product, percent by weight | 85.2 | 88.0 |
| Aromatics content of the depentanized, reformed product, percent by volume | 70.0 | 54.3 |
| Research octane number of depentanized, reformed product | 94.1 | 84.2 |
| Performances obtained at the temperature of 500° C.: |  |  |
| Yield in depentanized, reformed product, percent by weight | 82.6 | 86.1 |
| Aromatics content of the depentanized, reformed product, percent by volume | 73.9 | 60.0 |
| Research octane number of the depentanized, reformed product | 96.8 | 90.3 |

[1] See footnote bottom of Table 1.

The process for preparing a catalyst for the reforming and aromatization of benzines, according to the invention, offers the following advantages:

A particularly stable catalyst of high activity is produced. This can be seen by the fact that Research Octane Numbers of 91.0 are obtained for the fresh catalyst and 89.2 for the catalyst having processed 12 m.$^3$ of feed stock/ kg. of catalyst, and which had then been regenerated. Furthermore, during this long duration test, the aromatics content varied only from 61.0% by vol. to 58.5% by vol., the yield increasing from 87.2% to 87.5% by weight. In comparison with this catalyst, the catalysts prepared without a silica promoter, but which contained halogens, had a decrease of activity, for the same test time, of 7 to 12 octane units and 10 to 16 percent by volume of aromatics in the depentainized, reformed product.

The method of preparation of the catalyst according to the invention is simple and easy to carry out.

The silicon halides used at the step of depositing silica on the support are substances that may be easily obtained in a very pure form, the danger of poisoning of the catalyst being thus avoided.

The process according to the invention allows its application independently of the method of depositing the platinum, of forming the catalyst, this creating a flexibility in the production of catalysts of this type.

What is claimed is:

1. A process for the preparation of an active stable catalyst for the reformation and aromatization of hydrocarbons, comprising the steps of:
   depositing silica on alumina by treating alumina containing 4% to 40% water with a solution in hydrocarbon solvent of a silicon-halide capable of reacting with the alumina to form silica thereon in an amount sufficient to yield a concentration of silica in the catalyst between 0.05% and 5%; and
   depositing platinum on the silica-containing alumina thus produced.

2. The process defined in claim 1 wherein said silicon-halide is silicon tetrachloride, said solvent is a hydrocarbon solvent with a boiling-point range between 60° C. and 90° C., and the alumina is treated with said silicon tetrachloride until the silica content in the catalyst is between 0.1% and 2%.

References Cited

UNITED STATES PATENTS

| 2,882,245 | 4/1959 | Heinemann et al. | 252—442 X |
| 3,173,856 | 3/1965 | Burton et al. | 208—138 |
| 2,777,805 | 1/1957 | Lefrancois et al. | 208—139 |
| 3,303,043 | 2/1967 | Halpaap et al | 252—455 X |
| 3,389,092 | 6/1968 | Sanford et al. | 252—455 X |
| 3,598,759 | 8/1971 | Bertolacini | 252—455 |

PATRICK P. GARVIN, Primary Examiner

U.S. Cl. X.R.

208—139